(12) United States Patent
Nguyen et al.

(10) Patent No.: US 6,839,469 B2
(45) Date of Patent: Jan. 4, 2005

(54) MULTIPARALLEL THREE DIMENSIONAL OPTICAL MICROSCOPY SYSTEM

(76) Inventors: Lam K. Nguyen, 331 Andes Way, Corona, CA (US) 92075; Miguel Bravo-Zanoquera, 4059 C Miramar St., La Jolla, CA (US) 92037; Albert L. Kellner, P.O. Box 22313, San Diego, CA (US) 92192; Jeffrey H. Price, 3652 Torrey View Ct., Solana Beach, CA (US) 92075

( * ) Notice: Subject to any disclaimer, the term of this patent is extended or adjusted under 35 U.S.C. 154(b) by 80 days.

(21) Appl. No.: 09/765,114

(22) Filed: Jan. 19, 2001

(65) Prior Publication Data

US 2002/0044346 A1 Apr. 18, 2002

Related U.S. Application Data

(60) Provisional application No. 60/177,524, filed on Jan. 21, 2000.

(51) Int. Cl.[7] .................................................. G06K 7/10
(52) U.S. Cl. ....................................... 382/255; 358/254
(58) Field of Search ................................. 382/255, 254; 348/208.12, 345–356

(56) References Cited

U.S. PATENT DOCUMENTS

| | | | | |
|---|---|---|---|---|
| 5,448,053 A | * | 9/1995 | Rhoads ..................... | 250/201.9 |
| 5,614,938 A | * | 3/1997 | Sugiyama et al. .......... | 347/247 |
| 5,640,001 A | * | 6/1997 | Danielson et al. ..... | 235/462.23 |
| 5,804,805 A | * | 9/1998 | Koenck et al. ........ | 235/462.01 |

* cited by examiner

Primary Examiner—Thomas D. Lee
Assistant Examiner—Stephen Brinich
(74) Attorney, Agent, or Firm—Incaplaw; Terrance A. Meador (57) ABSTRACT

Volume imaging is supported in an optical apparatus that simultaneously acquires multiple images from multiple focal planes in an image object. A plurality of image detectors is arranged with respect to an objective lense. A plurality of reflective devices are disposed between the objective lense and the plurality of detectors to divide the light travelling through the objective lense to the detectors into channels such that each channel is registered with a respective detector.

12 Claims, 5 Drawing Sheets

Reference Image, 365 μm    Shifted Image, 400 μm    Corrected Image, 365 μm

MULTIPARALLEL THREE DIMENSIONAL OPTICAL MICROSCOPY SYSTEM

RELATED APPLICATIONS

This application is a conversion of provisional patent application serial number 60/177,524, filed Jan. 21, 2000 and entitled MULTIPARALLEL THREE DIMENSIONAL OPTICAL MICROSCOPY SYSTEM, and contains subject matter related to U.S. patent application granted Ser. No. 09/235,215; filed Jan. 22, 1999 and entitled "AUTOMATIC ON-THE-FLY FOCUSSING FOR CONTINUOUS IMAGE ACQUISITION IN HIGH-RESOLUTION MICROSCOPY" and which is incorporated herein in its entirety.

BACKGROUND OF THE INVENTION

1. Field of the Invention

The invention relates generally to a system for imaging. In particular, the invention relates to a system for generating three dimensional images of a sample.

2. Background of the Invention

Multiplanar microscope imaging enables parallel computation of autofocus parameter values for high-speed image cytometry. Although image cytometry exhibits many potential advantages over flow cytometry, its substantially slower speed has limited its use to fewer applications. In commercial image cytometry instruments, long scanning times have typically been circumvented by identification of small areas of interest during high speed, low resolution scans for subsequent analysis at high resolution. This two-pass strategy of analyzing only a few cells at high resolution is a disadvantage and often cannot be used at all where dim fluorescence demands higher numerical aperture (NA) objectives. Continuous stage motion synchronized with line array or time-delay-and-integrate (TDI) CCD image acquisition (analogous to web inspection in machine vision) is capable of increasing scan speeds by an order of magnitude or more, but until recently lacked the autofocus required for higher resolution (NA>0.5) objectives where depth of field is about the thickness of a cell monolayer.

In high-resolution scanning cytometry, cell borders and textures are important features necessary for quantitative measurements and classification. To achieve the high level of details, optical systems with high numerical aperture (NA) are required. Objectives with NAs>0.5 often reduce the depth-of-focus to less than 1 micron, requiring refocusing for each field of view (FOV) to maintain image quality. Therefore, autofocus can be essential in scanning cytometry. Currently, most autofocus implementations are for incremental scanning. Because these methods require sequential acquisition of a series of test focus planes and start-and-stop motion of the microscope stage, the scanning rates of these implementations are slow, especially at high magnification. There have been efforts to improve scanning speed by incorporating continuous stage movement with on-the-fly autofocus. Simultaneous multiplanar image acquisition for tracking focus and 3D imaging employing fiber optic bundles optically coupling an array of cameras to a series of imaging planes is disclosed in M. Bravo-Zanoguera and J. H. Price, "Simultaneous Multiplanar Image Acquisition in Light Microscopy," SPIE 3260, pp. 194–200, 1998. However, optical fibers and optical waveguides are fragile, require mechanically complicated fixtures, and have light transmission efficiency of only about 50%. For simultaneous multiplanar acquisition to be practical and widely implemented, a simpler setup is necessary.

In microscopy, several image criteria including resolution, contrast, and entropy have been used in different methods for determining focus; however, the resolution criterion has dominated in biological microscopy and has been shown to be very robust and accurate. Highest resolution is obtained at best focus. Details blur as the image is defocused and resolution is lost. One measure of resolution is the high-frequency content of the Fourier frequency spectrum. Typical focussing implementations utilize highpass or bandpass filters making up of the first and the second derivatives of the image intensity. More recently, higher order digital and analog filters have been shown to eliminate spurious maxima by removing lower frequency contrast reversals. The resulting frequencies are used to compute a focus index as a function of the axial (z) position (i.e., an autofocus circuit outputs a voltage that is proportional to the degree of sharpness of the image.) Measurement of this focus index at several planes of focus together with an appropriate algorithm is used to calculate the position of best focus.

Simultaneous multiplanar acquisition is based on the use of axial displacement of each detector to focus on corresponding different planes in specimen space. This axial displacement, however, usually results in some change in magnification. Changes in magnification translate to different distributions in the frequency spectrum, which in turn alter the focus index. Previous autofocus implementations have assumed that the effect of magnification on focus index is negligible, or can be corrected by changing the focus index gain. In some cases, the magnification changes are as high as 6% for a 10-micron shift in the specimen plane, depending on the type of microscope and objective used. Furthermore, in future 3D imaging applications, the changes in magnification will require correction before a stack of 2D images is further processed and viewed as a 3D image. In addition, by correcting for difference in magnification before the data is recorded, later image processing tasks such as filtering, segmentation, and classification are simpler and possibly more accurate by not having to compensate for magnification. Thus, magnification correction is an important feature of multiplanar image acquisition.

There are mainly three approaches to autofocus in scanning cytometry: pre-determined focussing, one camera focussing, and multiple camera focussing. Pre-determined focussing is often used in low-resolution and low NA scanning, in which the depth-of-field can be as much as 10 microns. Typically in these applications, foci at three locations are measured and used to determine an average focus plane and the scan of the entire slide is performed with little or no refocusing.

In incremental scanning, focussing is typically performed using one camera. In each FOV, the objective is displaced in small increments to collect a z-series typically of seven to nine 2D images. Sharpness of each image is measured and used to find the in-focus position. With the assumption that an ideal focus function curve has a sharp peak centered at the best focus position, common implementations use either a maximum algorithm or a power-weighted algorithm to determine focus. The maximum algorithm chooses the position of the sharpest test image to be the in-focus position, thus usually requiring more planes for accuracy. The power-weighted algorithm calculates the best focus position by using the focus indices as weights of their respective axial positions. The focus indices are often raised to a power to further increase robustness. Due to the sequential z-series acquisition and start-and-stop stage motion, incremental scanning rate is slow and usually limited to approximately 3–4 Hz.

To achieve faster scanning speed, the stage motion is kept continuous in continuous scanning. This, however, requires autofocus to be done on the fly and the collection of the test focus images to be carried out in parallel. One such method is disclosed in M. Bravo-Zanoguera and J. H. Price, "Simultaneous Multiplanar Image Acquisition in Light Microscopy," SPIE 3260, pp. 194–200, 1998. Multiple time-delay-and-integrate (TDI) cameras are coupled to different axial positions in the imaging volume by means of fiberoptic imaging bundles (FIB). This continuous scanning setup is complex and fragile. Due to side-by-side arrangements of the FIBs, there are non-uniform spatial delays between the cameras.

Consequently, the autofocus algorithm must keep track of these delays and account for them appropriately in calculating the focus position. In order to accommodate different magnification and fiber arrangements, the FIBs are required to slide against each other axially. The inherent fragility of the FIBs and their bonds to the CCD detectors requires a mechanically complex supporting fixture and extreme care be taken in its operation. Furthermore, the FIBs have low light transmission efficiency at approximately only 50%.

There is a need for a new and simplified optically aligned and magnification matched setup for multiplanar acquisition.

DETAILED DESCRIPTION OF THE PREFERRED EMBODIMENT

The invention relates to a system for viewing a sample. The system utilizes beam-splitters and mirrors to couple two or more detectors to an imaging volume. In addition, optics are employed to correct for magnification differences between the channels. By using beam-splitters, multiple channels are established that are spatially aligned simplifying the data processing procedure. Also, by employing common optical components with simple geometry, the invention realizes a high light transmission efficiency with an optically and mechanically sample setup. Additionally, this system can support higher scanning rates through high-speed parallel acquisition. Accordingly, these improvements can simplify data processing procedures used for automated microscopy. Further, practical implementations of scanning cytometry at high resolution over large areas at speeds comparable to flow cytometry can become possible.

Figure 1:
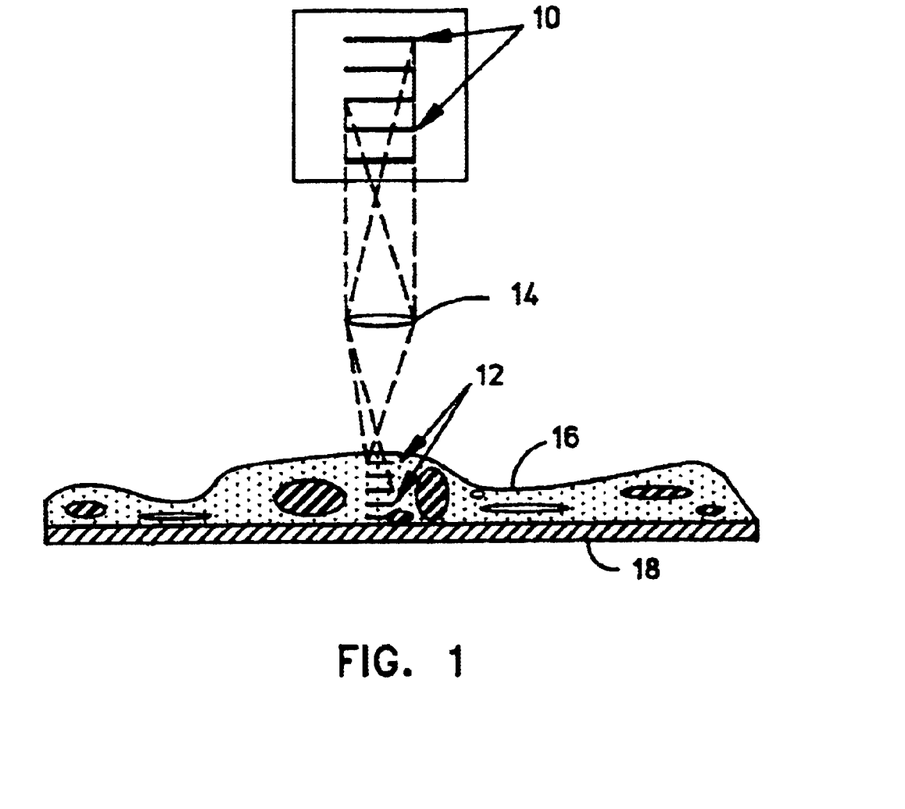
FIG. 1 illustrates a plurality of detectors positioned at different distances from an objective lense.

Simultaneous multiplanar acquisition of images of a sample 16 is based on the use of two or more detectors 10 focussed at different focal planes within the sample 16. FIG. 1 illustrates a plurality of detectors 10 which are each associated with a focal plane 12. Each detector 10 is located at a different distance from an objective lense 14. Accordingly, the focal plane 12 associated with each detector 10 is positioned at a different depth within the sample 16.

Detectors 10 for use with the system of the present invention are preferably line array or TDI cameras. The lines scan of these detectors 10 can be synchronized with movement of a sample holder 18 in order to achieve image acquisition with continuous stage movement. TDI cameras increase sensitivity in proportion to the number of integrating lines. TDI cameras can be thought of as line array cameras with multiple stages. By synchronizing the relative motion of the image with the clock frequency in the transverse direction, the charge is summed over all the line array stages. With the use of TDI cameras, the photo-generated charge is transferred and integrated from line to line, which greatly increases the sensitivity over area or single line arrays (e.g., 80 times for a 96-stage TDI array with 1024×96 pixels.) In addition, TDI cameras can be operated in full-frame mode when provided with either a shutter or strobed illumination. Besides the increase in sensitivity, this provides the flexibility for use of the imaging module in discontinuous scanning for testing, calibration, and other applications.

Figure 2:
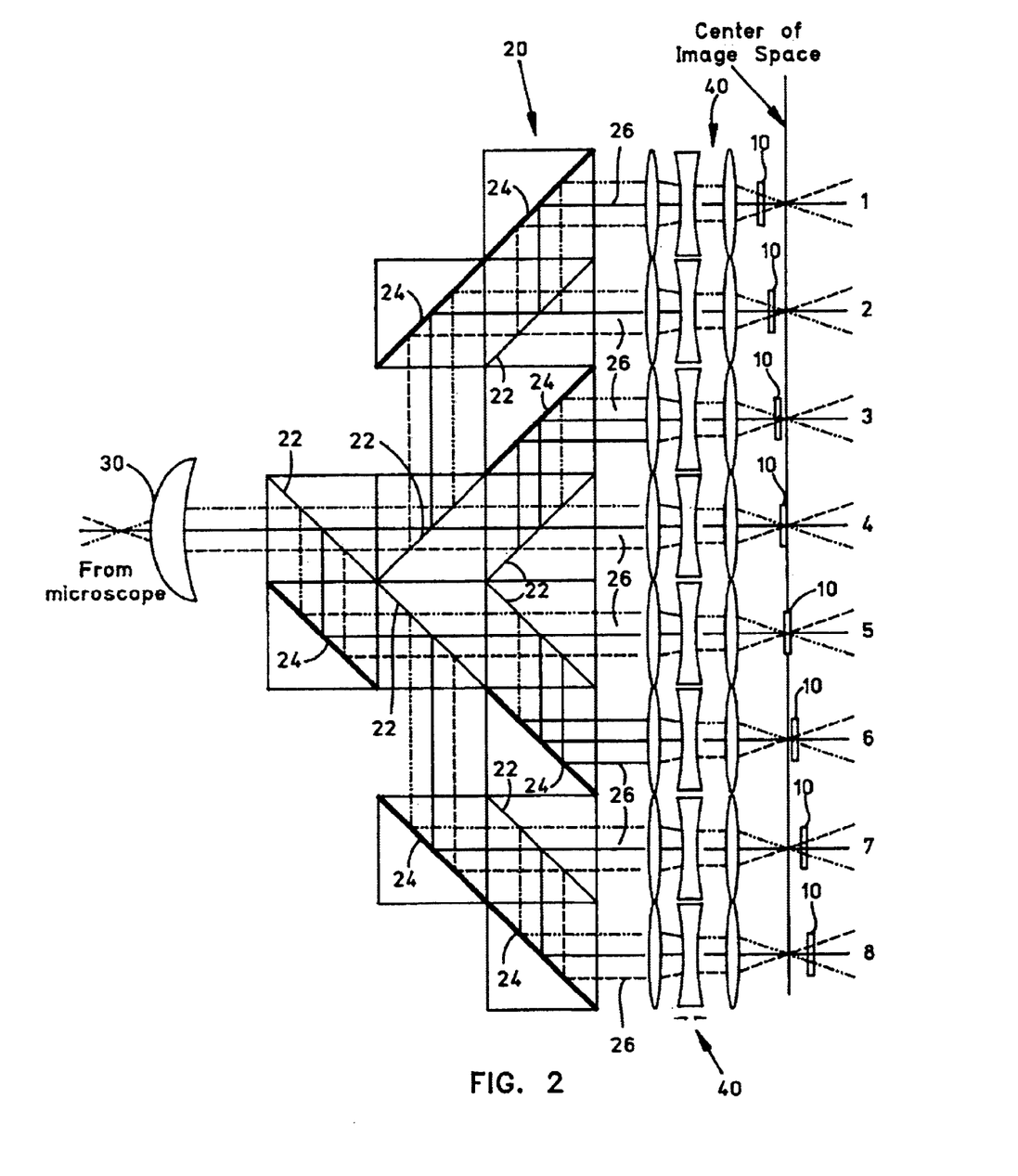
FIG. 2 illustrates an assembly for coupling a plurality of detectors with an image volume.

FIG. 2 illustrates an optical assembly 20 for coupling eight detectors 10 to the image volume. Although the assembly 20 of FIG. 2 employs eight detectors 10, the assembly 20 can easily adapted for use with a different number of detectors 10. The assembly 20 employs a series of beam-splitters 22 and mirrors 24 to divide the image from a microscope 14 into eight channels 26. (These channels are numbers 1–8 along the right margins of FIG. 2). The design is made inexpensive by employing off-the-shelf optics. For instance, the beam-splitters are preferably panchromatic 50/50 beam-splitters 22. The use of beam-splitters and mirrors 24 can simplify the mechanical supporting structure since they requiring only simple mounts due to their geometry. Each of the channels 26 is an optical path for transmission of light to a respective detector 10. The paths are parallel and transmit the same image information from the objective lense 14, through the mirrors and beam-splitters of the optical array 20, to the detectors 10.

Due to the inherent large number of air-glass interfaces caused by use of the mirrors 24 and beam-splitters 22, the surfaces of the optical components require appropriate anti-reflection coatings to minimize light losses. For an eight-channel setup, there are up to 17 glass-air surfaces per channel 26. If the optical components were not coated, the reflection losses alone would drop the transmittance to each channel 26 to about 6.2% (assuming 4% loss per surface, $0.96^{17}/8$). With standard anti-reflection coatings, which reduce reflection losses to less than 1% at each surface, the efficiency increases to 10.5% ($0.99^{17}/8$). These are conservative estimates; modem coating methods can achieve much better efficiency. On the other hand, this design allows transmission of the entire FOV to each channel 26. Thus, TDI cameras with large number of stages (e.g., 1024 pixels by 1024 lines) can be used to partially compensate for the low light condition.

The light entering the assembly 20 is preferably collimated with an appropriate lens 30 at the assembly 20 input. This collimation of the light can minimize aberrations, simplify the arrangement, and eliminate the need for equal optical path lengths.

Each detector 10 has a different displacement from the objective lense 14 along an imaginary optical axis of the lense 14 so each detector 10 is focussed at a different depth within the sample 16. This can be achieved through a sizable range about a nominal focus position without degradation of the optical quality of the transmitted image.

The even number of channels 26 and layout of beam-splitters 22 and mirrors 24 for an even number of reflections creates eight image channels 26 that can be easily registered with the detectors 10. When the detectors 10 are TDI cameras, this is especially important because image formation depends on the direction of stage motion. With the channels 26 spatially aligned, the delays associated with fiberoptic coupling are eliminated.

Figure 3:
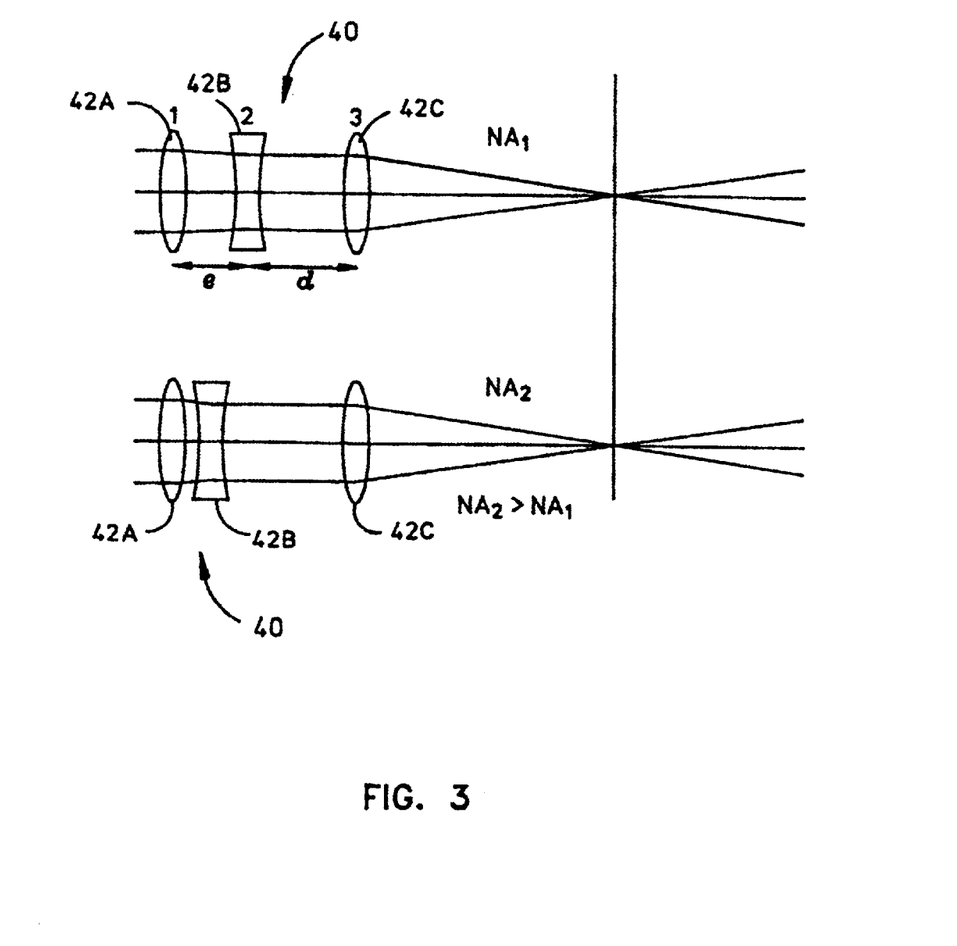
FIG. 3 illustrates an embodiment of correction optics for correcting of the different degrees of magnification in different channels.

Displacing each detector 10 a different distance from the objective lense 14 causes changes in the degree of magnification seen by each detector 10 as described above. Magnification correction can be performed optically or computationally. When the magnification errors are less than 10%, the assembly 20 can include relatively simple and cost effective correction optics 40 that introduce little light loss and eliminate an additional computational burden. An embodiment of the correction optics 40 employing a first lens 42A, a second lens 42B and a third lens 42C is illustrated in FIGS. 2 and 3. Since the light coming out of each channel 26 of the beam-splitter system is collimated, the first lens 42A focuses the light to an image at its focal point serving as the object for the second lens 42B. Magnification correction is achieved with the second lens 42B and the third lens 42C that have the combined magnification given by the thin lens doublet formula labeled Equation 1.

$$M = \frac{f_2 f_3}{(s_{2o} - f_2)(d - f_3) - s_{2o} f_2}$$ Equation 1

Figure 4:
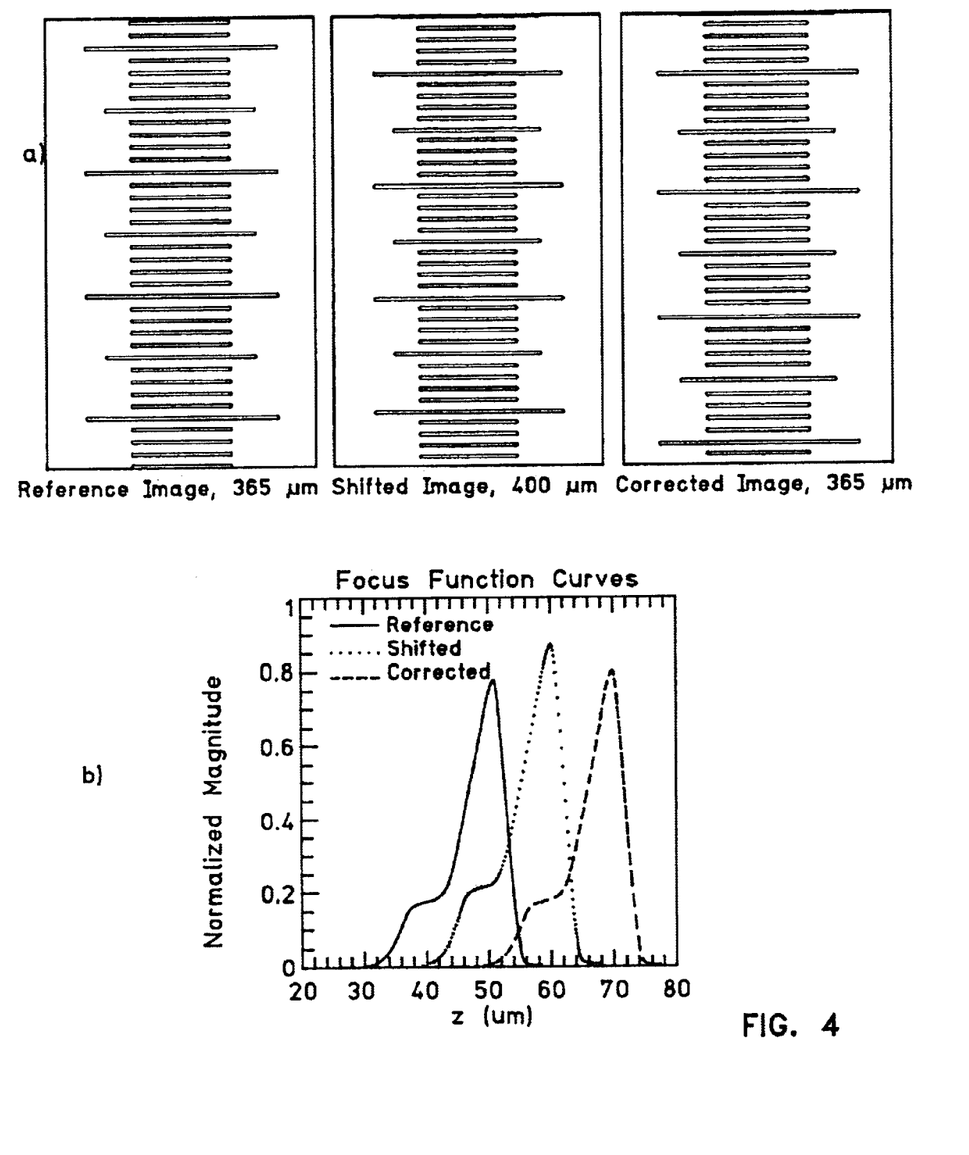
FIG. 4 illustrates the effect of removing different degrees of magnification from the different channels.

In equation 1, $f_{1-3}$ are the focal lengths of the respective lenses as labeled in FIG. 3, d is the distance between the second lens 42B and the third lens 42C, and $s_{2o}$ is the difference between $f_1$ and the distance between the first lens 42A and the second lens 42B, e. The magnification can be adjusted by varying d and e. FIG. 4 illustrates the effects of correcting for the magnification differences.

In setting up the system for operation, one channel 26 is chosen to be a reference channel 26 (i.e. channel 26 5 in FIG. 2.) The detector 10 associated with the reference channel 26 is positioned exactly at the focal point of lens 3. A reference image is captured using a known thin test sample 16 (e.g., a micrometer slide) from this channel 26 and used for calibrating the other channels 26. For each remaining channel 26, the specimen is displaced axially to the desired position. The position of the camera with respect to lens 3 and the location of lens 2 are adjusted iteratively until the image is in focus and the same magnification is achieved. With various focal lengths and spacing between the lenses, magnification corrections of up to 10% are expected with little or no measurable aberrations or distortions with this simple optical arrangement.

Although the light source is not illustrated, the light source can be included in a microscope assembly that includes the objective 14, in the assembly 20 or elsewhere in the system as is known in the art. In the simplest and probably least expensive implementation a bright light source is preferred. Alternatively, when a TDI detector 10 is employed, the number of TDI lines can be increased to cover a large area and collect more light. Suitable light sources include, but are not limited to, an incandescent lamp, a laser and an arc lamp. Incandescent lamps may be employed but may not be bright enough for operation of the system. Arc lamps are likely to deliver sufficient light, but because they require replacement every few hundred hours they can become somewhat expensive. Another alternative is a diode laser, which lasts much longer and therefore may be less expensive.

Figure 5:
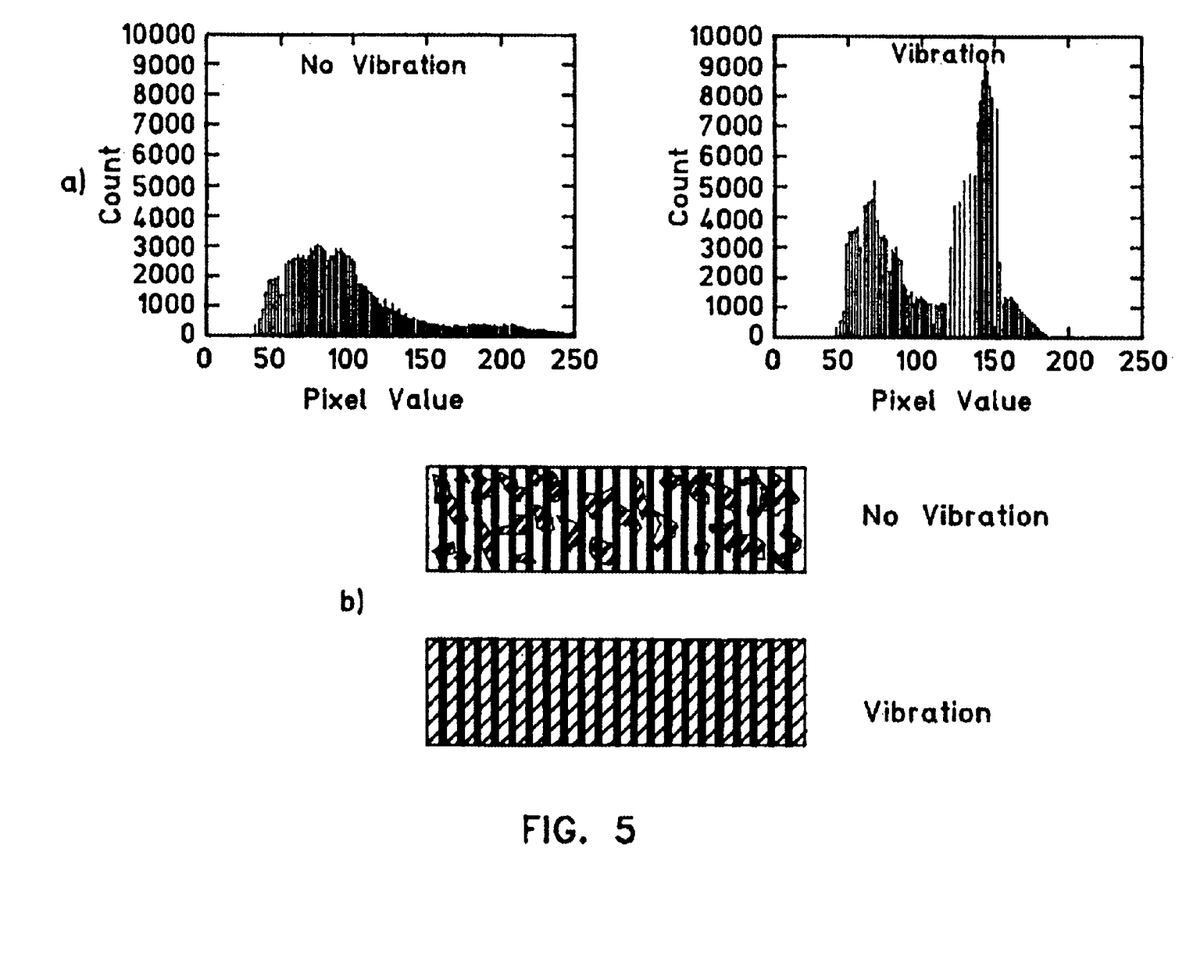
FIG. 5 illustrates the effects of removing speckle resulting from coherency in a laser light source.

High intensity and mono-chromaticity make lasers excellent light sources for microscopy. But with coherence, the rays coming from the laser interfere and produce a pattern known as speckle, which drastically degrades image quality. As a result, lasers have been primarily used in spot-scanning microscopy. Since applications in which this imaging module is intended for are either in phase-contrast or bright field modes, the speckle must be eliminated. Several methods have been reported for canceling the effects of the speckle including digital post processing, multi-length fiber coupling, vibration of the sample 16, and rotation or vibration of the optical fiber. The simplest method is to vibrate an optical fiber that couples the laser to the objective lense 14. The vibration causes continuous changes in optical path lengths in the fiber causing rapid movement of the speckle pattern. As long as the vibration is sufficiently fast compared to the integration time of the camera, the speckle pattern can be removed as illustrated in FIG. 5.

Arc lamps are extremely bright and have broad spectrum, which have been commonly used as light sources in fluorescence microscopy. Arc lamps can be easily adapted for bright field illumination with the requirement of appropriate ultra-violet and infrared filters to protect the specimen from photobleaching and thermal damage. While providing probably the brightest light source of all cost comparable systems, arc lamps have the disadvantages of a relatively short lifetime (200–2000 hours), large heat generation, and non-uniform and unstable illumination. However, depending on the requirements of the application, the effects of these properties might be negligible (e.g., non-uniformity and instability have little effect on autofocus). Furthermore, there are methods available for either eliminating or minimizing their effects.

EXAMPLE 1

A Nikon Eclipse TE 300 microscope 14 was used in phase-contrast and bright-field illumination. The optics included a Plan Apo 20×0.75 NA Ph2 DM and a Plan Flour 40×0.60 NA Ph2 DM objectives, with a Nikon 0.3 NA extra long working distance condenser. A stage micrometer with 10 µm spacing was used as the test specimen. The images were further magnified 1.2–1.5× with a custom optical system onto a 6600 Progressive Scan model 3000 CCD camera (Cohu Inc., San Diego, Calif.), with a square picture element size of 9.9 µm, and 659(H)×494(V) active picture element.

Focus was changed with a piezoelectric objective positioner (PIFOC, Polytec PI, Costa Mesa, Calif.) model P-721.17 and an E-610.00 closed-loop controller (Polytech PI). Position of the PIFOC was controlled via the digital-to-analog (D/A) converter in a National Instruments (Austin, Tex.) PCI-6031E data acquisition board. The 16-bit D/A converter was used to divide the 100 µm range of the PIFOC into 800 steps of 0.125 µm each. The 16-bit (A/D) converter of this data acquisition board was also used for collecting the autofocus voltage value from a AFx-3000 autofocus board (Q3DM Ltd., San Diego, Calif.). An RS-170 image acquisition board, the Meteor II (Matrox Electronic System Ltd., Quebec, Canada) was used to capture the images. The magnification optics consisted of three lenses, 42×80 mm and 41×60 mm plano-convex lenses, and a 42×50 mm biconcave lens with custom supporting fixture made for coupling to the side port of the microscope 14.

A 675 nm, 3 mW diode laser (Thor Labs, Newton, N.J.) was coupled to the microscope 14 by a 20-foot 500 µm multimode fiber. The fiber was looped several times and vibrated at 60 Hz by an electric hair clipper with a total approximate displacement of 5 mm. Laser speckle images were capture with a custom camera using the EG&G (Salem, Mass.) 1024×96 pixel TDI CCD detector 10 in full frame mode with strobed illumination at 1.7 ms pulse duration.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. An optical apparatus for simultaneously acquiring multiple images from multiple focal planes in an image object, comprising:

an objective lense;

a plurality of image detectors, each image detector having a respective optical displacement with respect to the objective lense so as to acquire images from differing focal planes;

a plurality of reflective devices disposed between the objective lense and the plurality of image detectors and arranged to divide light travelling through the objective lense toward the plurality of detectors into a plurality of channels, each channel registered with a respective image detector; and a plurality of magnification correction optics, each magnification correction optics disposed between the plurality of reflective devices and a respective image detector to correct magnification of the respective image detector.

2. The optical apparatus of claim 1, wherein each channel is an optical path for transmission of identical image information from the objective lense to the respective image detector.

3. The optical apparatus of claim 1, each image detector of the plurality of image detectors including a line array device.

4. The optical apparatus of claim 3, further including a sample holder for supporting and moving a sample in synchronism with line scanning of the plurality of line array devices.

5. An optical apparatus for simultaneously acquiring multiple images from a three-dimensional sample volume, comprising:

an objective lense;

a plurality of image detectors, each image detector having a respective optical displacement with respect to the objective lense so as to acquire images from focal planes positioned at different depths within the three-dimensional sample volume;

a plurality of reflective devices disposed between the objective lense and the plurality of image detectors and arranged to divide light travelling through the objective lense toward the plurality of detectors into a plurality of channels, each channel registered with a respective image detector; and a plurality of magnification correction optics, each magnification correction optics disposed between the plurality of reflective devices and a respective image detector to correct magnification of the respective image detector.

6. The optical apparatus of claim 5, wherein each channel is an optical path for transmission of identical image information from the objective lense to the respective image detector.

7. The optical apparatus of claim 5, each image detector of the plurality of image detectors including a line array device.

8. The optical apparatus of claim 7, further including a sample holder for supporting and moving a sample in synchronism with line scanning of the plurality of line array devices.

9. An optical apparatus for acquiring multiple images from a three-dimensional sample volume, comprising:

an objective lense;

a plurality of image detectors, each image detector having a respective optical displacement with respect to the objective lense so as to simultaneously acquire images from differing focal planes;

a plurality of reflective devices disposed between the objective lense and the plurality of image detectors and arranged to divide light travelling through the objective lense toward the plurality of detectors into a plurality of channels, each channel registered with a respective image detector; and a plurality of magnification correction optics, each magnification correction optics disposed between the plurality of reflective devices and a respective image detector to correct magnification of the respective image detector.

10. The optical apparatus of claim 9, wherein each channel is an optical path for transmission of identical image information from the objective lense to the respective image detector.

11. The optical apparatus of claim 9, each image detector of the plurality of image detectors including a line array device.

12. The optical apparatus of claim 11, further including a sample holder for supporting and moving a sample in synchronism with line scanning of the plurality of line array devices.

* * * * *

UNITED STATES PATENT AND TRADEMARK OFFICE
CERTIFICATE OF CORRECTION

| | |
|---|---|
| PATENT NO. | : 6,839,469 B2 |
| APPLICATION NO. | : 09/765114 |
| DATED | : January 4, 2005 |
| INVENTOR(S) | : Lam K. Nguyen et al. |

Page 1 of 1

It is certified that error appears in the above-identified patent and that said Letters Patent is hereby corrected as shown below:

In Column 1, Line 3, after RELATED APPLICATIONS, add --The research and development for inventions described in this application received funding under NASA Grant No. NAG9-1354 from the National Aeronautics and Space Administration, NSF Grant No. BES-9871365 from the National Science Foundation and NIH Grant Nos. DK55064 and HD37782 from the National Institutes of Health. The U.S. Government may have rights to various technical features described in this application. --

Signed and Sealed this

Twenty-first Day of August, 2007

JON W. DUDAS
*Director of the United States Patent and Trademark Office*